United States Patent [19]

Crawford et al.

[11] Patent Number: 4,646,900

[45] Date of Patent: Mar. 3, 1987

[54] FRICTION MATERIAL AND CARRIER PLATE ASSEMBLY

[75] Inventors: Peter F. Crawford, Bubbenhall; Steven Trotman, Snitterfield, both of England

[73] Assignee: Automotive Products plc, Leamington Spa, England

[21] Appl. No.: 784,185

[22] Filed: Oct. 4, 1985

[30] Foreign Application Priority Data

Nov. 24, 1984 [GB] United Kingdom ............... 8429745
Feb. 12, 1985 [GB] United Kingdom ............... 8503613

[51] Int. Cl.⁴ ........................................... F16D 13/64
[52] U.S. Cl. ........................... 192/107 R; 192/107 M; 192/113 A; 188/251 R
[58] Field of Search ........... 192/107 M, 107 R, 70.12, 192/113 A; 188/251 R

[56] References Cited

U.S. PATENT DOCUMENTS

| 399,665 | 3/1889 | Hatt | 188/251 R |
|---|---|---|---|
| 2,141,164 | 12/1938 | Brehm | 192/107 M |
| 3,807,534 | 4/1974 | Eldred | 192/107 R |
| 3,850,277 | 11/1974 | Adachi | 192/113 A |
| 3,948,364 | 4/1976 | Lowey | 192/107 M |
| 4,139,085 | 2/1979 | Kanbe et al. | 192/113 A |
| 4,286,694 | 9/1981 | Wiseman, Jr. et al. | 192/113 A |

FOREIGN PATENT DOCUMENTS

| 2822729 | 12/1978 | Fed. Rep. of Germany | 192/107 R |
|---|---|---|---|
| 73681 | 2/1932 | Sweden | 192/113 A |

Primary Examiner—William F. Pate, III
Assistant Examiner—Caroline D. Dennison
Attorney, Agent, or Firm—Solon B. Kemon

[57] ABSTRACT

A friction material and carrier plate assembly which may be used in the construction of a driven plate of a friction clutch has a flat, metal, disc-shaped, carrier plate integral with spokes co-planar with the carrier plate and radiating from the outer periphery of the plate. The spokes are adhesively bonded and/or riveted to the bases of recesses in one of the radial friction faces of a one-piece annulus of friction material, that face being proud of the spokes. The assembly is centered on an axis relative to which the annulus and spokes can flex axially.

10 Claims, 8 Drawing Figures

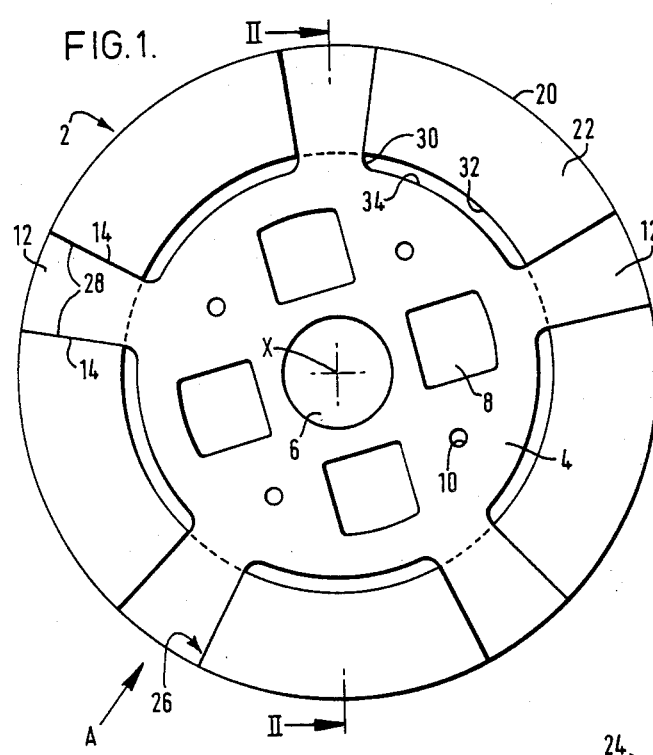
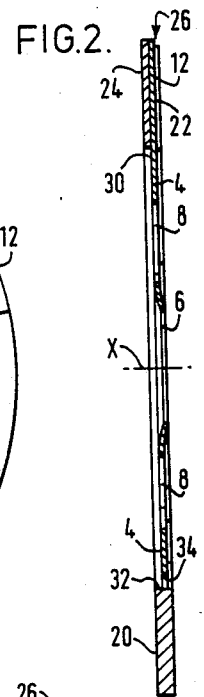
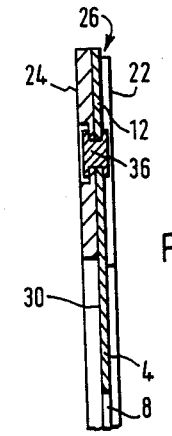
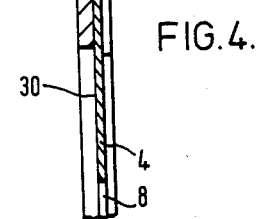

FRICTION MATERIAL AND CARRIER PLATE ASSEMBLY

BACKGROUND OF THE INVENTION

This invention relates to a friction material and carrier plate assembly comprising friction material annularly disposed about a central axis and providing first and second oppositely facing radial friction faces, and said friction material being secured to a carrier plate.

Such an assembly may be used as part of the construction of a friction clutch driven plate particularly, though not exclusively, for the clutch of a motor vehicle.

SUMMARY OF THE INVENTION

According to the invention a friction material and carrier plate assembly comprises friction material annularly disposed about a central axis and having first and second oppositely facing radial friction faces, said first friction face having recesses therein, the carrier plate being provided at its outer periphery with outwardly directed spokes, the spokes being disposed in said recesses, and the first friction face being proud of the spokes in the recesses.

With such an arrangement a rotational driving connection between the friction material and carrier plate need not be solely by the means of securement between the material and plate but can be augmented due to the insetting of the spokes into the friction material and advantageously a said recess has a side (preferably a trailing side in relation to the direction of rotation of the carrier plate) extending transversely to a said friction face, and a side of a said spoke in that recess is in juxtaposition with the side of the recess.

One or more of the spokes may be secured in the recesses by adhesive-bonding, and/or by mechanical securing means, for example rivets, engaging the friction material.

A driven plate comprising the assembly formed in accordance with the invention can be used in a clutch in which the driven plate is releasably clampable between a fly-wheel or driving plate and a pressure plate under the action of spring means, for example, a diaphragm spring.

Friction clutch driven plates having annular friction facings adhered directly to both sides of a metal carrier plate are known having no cushioning between the facings, but this lack of cushioning gives rise to heat spotting caused by rubbing of the driven plate friction faces over high spots on the pressure plate and driving plate. Heat spotting can cause rapid breakdown of the friction material. To mitigate this drawback British Pat. No. 2044864 discloses a friction clutch driven plate having two co-axial annular friction facings each moulded directly onto its own respective carrier plate, the two carrier plates being arranged back-to-back to present the friction faces of the facings in axially opposite directions, and being joined so that the backs of the carrier plates are resiliently spaced apart allowing the friction faces to flex on contact with a driving member surface when applied to the faces under an axial load. This is a relatively complex construction.

To reduce the chance of heat spotting, an embodiment of the invention can be advantageously formed in which the annularly disposed friction material can flex between the spokes. This permits axial deflections or deformations of the friction material and, as will be understood from the description below, the embodiment can be of simple construction.

BRIEF DESCRIPTION OF THE DRAWINGS

The invention will now be further described, by way of example, with reference to the accompanying drawings in which:

FIG. 1 is a plan view of a friction material and carrier plate assembly formed according to the invention and intended to form part of a friction clutch driven plate;

FIG. 2 is a section on line II—II of FIG. 1;

FIG. 3 is an enlarged fragment of an elevation in the direction of arrow A in FIG. 1;

FIG. 4 is a section, similar to FIG. 2 but on an enlarged scale, of a fragment of a modification of the assembly in FIG. 1;

DETAILED DESCRIPTION OF THE INVENTION

Figure 5:
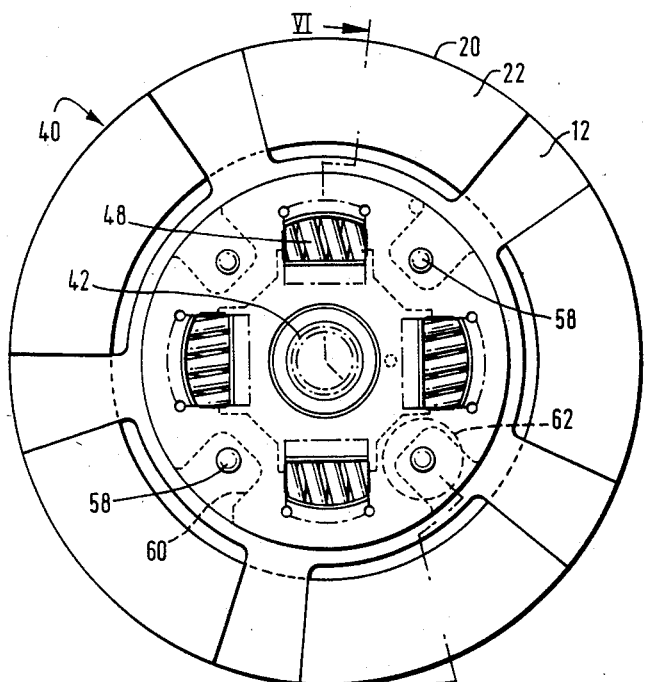
FIG. 5 is a plan view of a friction clutch driven plate including an assembly formed according to the invention.
Figure 7:
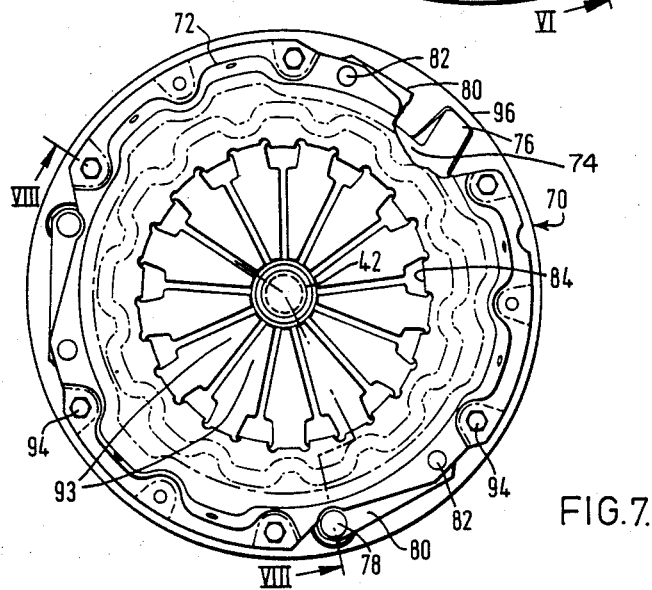
FIG. 7 is a plan view, partly fragmented and on a reduced scale, of a clutch including the driven plate in FIG. 5.
Figure 6:
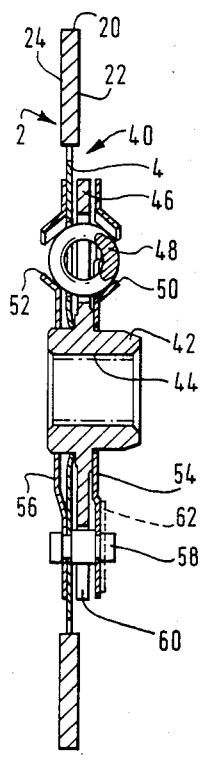
FIG. 6 is a section on line VI—VI in FIG. 5.
Figure 8:
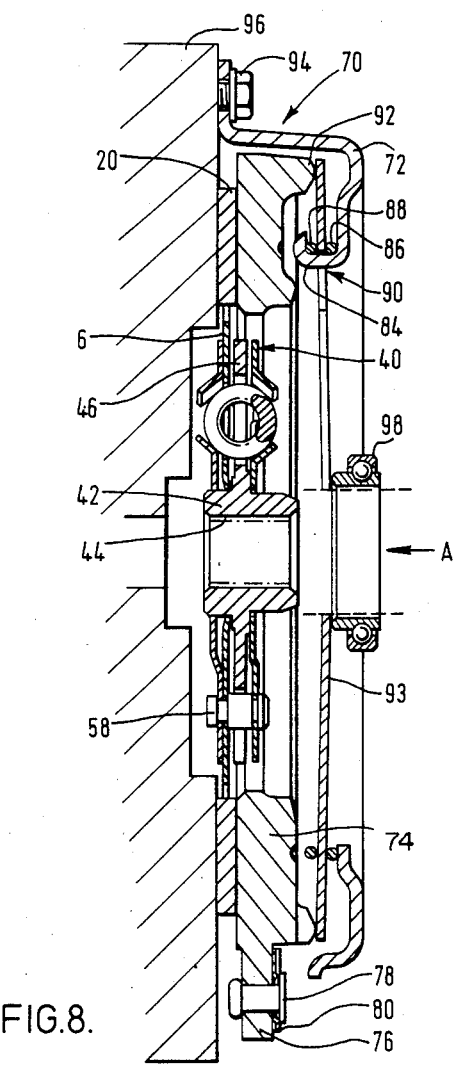
FIG. 8 is a section, on an enlarged scale, on line VIII—VIII in FIG. 7.

FIGS. 1 to 3 of the drawings show a friction material and carrier plate assembly 2 intended to form part of a friction clutch driven plate, for example driven plate 40 (FIGS. 5 and 6) which can be used in a clutch for a motor vehicle, for example a diaphragm spring clutch 70 (FIGS. 7 and 8).

The assembly 2 comprises a steel carrier plate 4 of disc form centrally apertured at 6 to fit, for example, on an internally splined hub 42 (FIGS. 5 and 6) when the assembly is incorporated in a said driven plate. Also the carrier plate is formed with windows 8 for torsional vibration damping springs 48 known per se (FIGS. 5 and 6) and holes 10 for stop rivets 58 known per se. At its outer periphery the carrier plate 4 has a plurality of outwardly projecting radial paddles or spokes 12 integral with the main body of the carrier plate. The spokes are flat being substantially co-planar with the main body of the plate 4 and, in the example, are substantially equi-angularly spaced about central axis X. Also in the example, the spokes 12 are all similar, each extending over substantially 18° of arc about the axis X and having substantially radial opposite sides 14.

An integral annulus 20 of friction material of any kind known per se and, for example, of a non-asbestos type has oppositely facing radial friction faces 22 and 24. Recesses 26 extending across the radial width of the annulus 20 are formed in the face 22. These recesses accommodate the spokes 12 fairly closely in that opposite substantially radial sides 28 of each recess are in juxtaposition with the sides 14 of the spokes in that recess.

The base of each recess 26 is flat and all are at substantially the same depth within the body of the annulus 20. Each spoke is adhesively bonded directly to the recess base. The adhesive technique used may require adhesive to be initially applied to both the recess base and to the spoke surface to be adhered to the base.

As can be seen in FIGS. 2 and 3, the spokes 12 are disposed in the annulus 20 so that the friction face 22 is proud of the spokes.

From its outer end each spoke 12 extends radially inwardly to a root 30 which is radially inwardly of the inner periphery 32 of the annulus 20, and a circumferential portion 34 of the carrier plate between adjacent spokes is spaced from the adjacent inner periphery of the friction material.

The friction material chosen for the annulus 20 can have some ability to deform or flex resiliently in the axial direction, for example, between the spokes 12. This reduces the chance or effect of heat spotting when a driven plate incorporating the assembly 2 is in use. Also the spokes 12 can be in the nature of leaf springs capable (with respect to the axis X) of some axial resilient flexing, particularly in the vicinity of their roots 30, which also allows axial deformation or flexing of friction annulus 20. In the example in FIGS. 1 to 4, in the plane of the plate 4, the spokes 12 co-planar with the plate are rigid or substantially non-deformable circumferentially of the plate.

Since the spokes 12 are inset in the recesses 26, the portion of each recess not occupied by the spoke acts as a passage for air flow when (depending on how the assembly 2 is incorporated in the driven plate) a driving plate or a pressure plate of a clutch is clamped against the face 22. Preferably, the other friction face 24 is grooved to also provide air flow passages.

As an alternative or in addition to bonding, the spokes 12 may be secured to the friction material by mechanical securing means, for example rivets 36 (FIG. 4) with respect to which the faces 22 and 24 are proud.

The close proximity of a spoke side 14 to a recess side 28 means that when (with respect to the direction of rotation of the assembly 2) that side 28 is a trailing side, then the recess side can push the spoke to augment the driving connection through the adhesive bond and/or mechanical securement between the recess and spoke.

As shown each spoke 12 and its corresponding recess 26 widen along a radially outward direction so they fit together dovetail fashion. This type of fit is particularly advantageous in the case where the spokes are merely riveted to the annulus 20 as the dovetail engagement can provide some further mechanical locking resistance to radially outward separation of the annulus 20 from the spokes.

Alternatively, the opposite side 14 of each spoke 12 may be substantially parallel and likewise the recess sides 28 adjacent thereto. This arrangement can allow relative expansion between the spokes 12 and annulus 20 when the spokes are merely riveted to the annulus. The radially outer ends of the spokes 12 may not extend as far as the outer periphery of the annulus 20.

The recesses 26 need not extend across the whole radial width of the annulus 20 but may terminate before reaching the outer periphery of the annulus, though the recesses may be continued by narrower grooves forming air passages. Such shortening of the recesses 26 requires the spokes 12 to be of appropriate dimension so as not to extend beyond the radially outer end walls of the recesses.

If desired the recesses 26 and the spokes therein may be raked relative to the axis X.

The driven plate 40 (FIGS. 5 and 6) comprises the hub 42 internally, axially splined at 44 and having an external flange 46 with windows receiving the torsional vibration damping springs 48 disposed in the windows 8. The springs 48 are also disposed in respective windows 50 and 52 in respective side plates 54 and 56 secured together by the stop rivets 58 passing through notches 60 in the periphery of flange 46. The stop rivets 58 also secure the carrier plate 4 to the side plate 56. At least one of the rivets 58 may also secure a counterweight 62 if such is desired. The ensemble 20, 4, 54, 56, 58 is capable of some rotation, within the limits of the notches 60, relative to the flange 46.

The driven plate can be used in the friction clutch 70 (FIGS. 7 and 8) having a cover assembly comprising a dish-shaped metal cover 72, an annular pressure plate 74 having lugs 76 secured by rivets 78 to leaf springs 80 constituting tangential drive straps and release springs riveted at 82 to the cover 72, and the cover having axially turned tabs 84 holding wire fulcrum rings 86 and 88 on either side of diaphragm spring 90 which presses on an annular fulcrum arrangement 92 on the pressure plate and has inwardly directed fingers 93 forming release levers. The cover assembly is bolted at 94 to a rotatably driven driving plate 96, for example a flywheel of internal combustion engine. In use the axial splines 44 engage in known manner splines on a rotary output shaft (not shown) which can be an input shaft to a change-speed-gearbox of a motor vehicle. Clamping force of the pressure plate 74 and driving plate 96 on the driven plate 40 is released by movement, in known manner, in direction A of a clutch release bearing 98 acting on the fingers 93.

We claim:

1. A friction material and carrier plate assembly comprising an integral annulus of resilient friction material disposed about a central axis having first and second axially oppositely facing radial friction faces, said first friction face having recesses therein extending from an inner periphery of the annulus, a carrier plate for rotation about said axis, said carrier plate being encircled by said annulus, said carrier plate having at its outer periphery outwardly directed spokes being disposed in said recesses and being secured to bases of the recesses, the first friction face being disposed axially beyond said spokes in said recesses, said annulus being capable of resilient flexing whereby the annulus can be deformed axially, and said spokes, with respect to said axis, being resiliently axially flexible.

2. An assembly according to claim 1, wherein at least one of said spokes is bonded to a said recess.

3. An assembly according to claim 1, wherein at least one of said spokes is secured to the friction material by mechanical fastening means.

4. An assembly according to claim 1, wherein a side of a said recess extends transversely to said first friction face, and a side of a said spoke in that recess is in juxtaposition with said side of the recess.

5. An assembly according to claim 1, wherein each recess extends across the radial width of the first friction face.

6. An assembly according to claim 1, wherein an outer peripheral portion of the carrier plate between two adjacent spokes is spaced radially inwardly from an adjacent inner peripheral portion of the friction material by an air gap.

7. An assembly according to claim 1, wherein each spoke is substantially flat in a plane transverse to the said axis.

8. An assembly according to claim 7, wherein each recess has two opposite substantially radial sides each in juxtaposition with a respective one of two opposite substantially radial sides of the spoke in the recess.

9. A driven plate for a friction clutch comprising an assembly according to claim 1.

10. A friction clutch comprising an assembly according to claim 1.

* * * * *